Aug. 24, 1926. Re. 16,411

H. S. STEPHENS

TOY BLOCK

Original Filed August 9, 1924

INVENTOR.
HARRY S. STEPHENS

BY Stuart C. Barnes
ATTORNEY.

Reissued Aug. 24, 1926. Re. 16,411

UNITED STATES PATENT OFFICE.

HARRY S. STEPHENS, OF DETROIT, MICHIGAN.

TOY BLOCK.

Original No. 1,586,589, dated August 25, 1925, Serial No. 731,063, filed August 9, 1924. Application for reissue filed December 17, 1925. Serial No. 76,132.

My invention is an improved toy block, the object of which is to provide a collapsible member within the block, which may be distended into the semblance of a toy animal, or man, or any other suitable configuration.

My toy block comprises a housing having side walls, a front wall so that the housing is open at top, bottom and back. The front wall may be painted or designed to represent the body of a person or animal. A pair of folding members are hinged together at their back portions and the lower one of these members has a pivot positioned adjacent its back portion so that the two members may be folded together back to back and swing on the single pivot so as to enclose these members in the housing, or these members may be extended so as to form head and leg sections, which may be painted or otherwise decorated to represent the head and legs of a person or animal.

In the annexed drawing in which the preferred form of my invention is illustrated:

Figure 1:
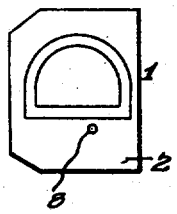
Fig. 1 is a side elevation of my block.
Figure 2:
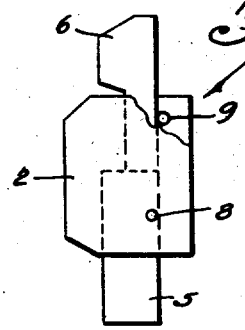
Fig. 2 is a side elevation of my block with the collapsible members extended.

Referring more particularly to the drawing, the housing 1 is formed in the semblance of a channel having side walls 2 and 3, and a front wall 4, the rear, top and bottom being left open. A pair of extendible members 5 and 6 are mounted within the housing 1, and are pivoted together at 7. The member 5 is pivoted to the side walls 2 and 3 by means of a pin 8 extending therethrough.

Figure 3:
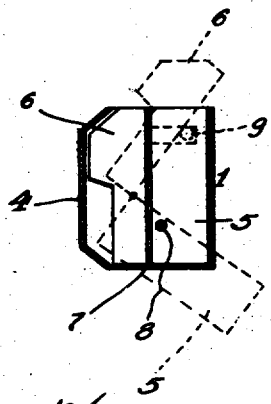
Fig. 3 is a transverse sectional view of my block.
Figure 4:
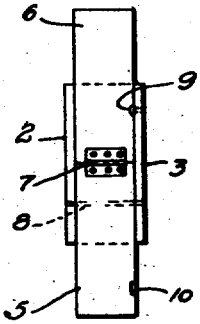
Fig. 4 is a rear view of the same.
Figure 5:
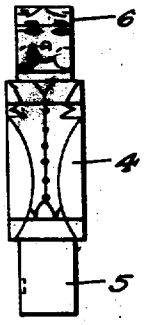
Fig. 5 is a front view of the same.

Thus, it will be seen that from the position shown in Fig. 3, if the member 5 is moved rearwardly, pivoting about the pin 8, the member 6 will move upwardly into the positions shown in Figs. 4 and 5. A stop pin 9 projects from the wall 3, which prevents the member 6 from tilting rearwardly while moving into the extended position—that is, said member is compelled to move upwardly instead of following the travel of the member 5.

A slot 10 is provided in one side of the member 5 into which the pin 9 is adapted to extend when the member 5 is in the folded position, shown in Fig. 3.

The members 5 and 6, and the front wall 4 may be suitably painted, etched, or printed into the semblance of an animal or manikin, and the side walls 2 and 3 may have letters, figures or pictures formed thereupon, as shown in Fig. 1.

My toy block has a double function; first, it is arranged to serve as a child's toy building character or alphabetical block when the two members 5 and 6 are folded or collapsed within the block, and second, it may serve as a child's toy manikin when the said members 5 and 6 are distended.

It will be noted that the two members 5 and 6 when folded in the housing are back to back as shown in full lines in Fig. 3 having been swiveled on the pin 8, which is adjacent the back of the member 5. The front wall 4 as will be noted in Fig. 5 is decorated to represent a body and the member 6, the head, and the member 5, preferably will be decorated to represent the legs.

While I have shown the preferred form of my invention, it may also be embodied in other forms, and it is understood that the construction thereof may be varied within the scope of the claims.

What I claim is:

1. A toy block comprising in combination a housing having front and side walls and being open at the back and top and bottom, a leg member pivoted between the side walls, a head member hinged to the inner end of the leg member, whereby when folded the head and leg members are positioned back to back and are encased by the side walls, the front of the leg member forming the back of the block the top of the block being formed by the top of the head member and the bottom of the leg member, and the bottom of the block being formed by the hinged faces of the head and leg members.

2. A toy block as claimed in claim 1, having a slot in the leg member and a pin extending from one of the inside walls into said slot when the block is folded.

3. A toy block as claimed in claim 1, having a slot in the leg member and a pin extending from one of the inside walls into said slot when the block is folded, said pin being positioned in the side to engage the back of the head member when the block is extended.

4. A toy block having in combination, a block having six or more faces and provided with a recess and which is arranged to serve as a child's toy building, character or alphabetical block, and a collapsible figure supported within said recess and consisting of a pair of members movably secured together, both of which when collapsed, form a part of the contour of the block and which, when distended, forms a figure in the semblance of a suitable animate figure.

5. A collapsible toy block having in combination, an angular block having six or more faces and which is arranged to serve, when collapsed, as a child's toy building, character or alphabetical block, and a member foldably supported within said block and forming a part of the contour thereof when folded, and which may be distended by manual operation, and arranged to form a figure when so distended in the semblance of a suitable animate figure of which the block forms a part.

6. A collapsible toy block, comprising a body portion having front and side walls and collapsible members forming when collapsed the top, bottom and rear walls of the block, said collapsible members being adapted to be distended relative to the body and co-operate with the body to form when so distended a figure in the semblance of a suitable animate figure.

7. A collapsible toy block forming, when collapsed, a block serving as a child's toy building, character or alphabetical block, and a manikin consisting of two parts hinged together and which is supported within said block and forms a part of the contour of said block.

In testimony whereof I have affixed my signature.

HARRY S. STEPHENS.